United States Patent
Fine

[15] 3,674,650
[45] July 4, 1972

[54] LIQUID PURIFYING SYSTEM

[72] Inventor: Max M. Fine, 135-17 Jewell Avenue, Kew Garden Hills, N.Y. 11415

[22] Filed: March 18, 1970

[21] Appl. No.: 20,751

[52] U.S. Cl. ...................... 202/176, 202/185, 202/186, 202/204, 210/167, 210/323, 68/18 F, 68/18 C
[51] Int. Cl. .................. B01d 3/00, B01d, F28b, C02c, B01d 23/00, C02b
[58] Field of Search .................. 210/323, 457, 493, 167; 202/168-170, 200; 68/18 R, 18 C, 18 F

[56] References Cited

UNITED STATES PATENTS

| | | | |
|---|---|---|---|
| 2,301,803 | 11/1942 | Davis | 68/18 R X |
| 2,836,045 | 5/1958 | Smith | 68/18 R |
| 3,011,956 | 12/1961 | Smith et al. | 202/206 |
| 3,085,415 | 4/1963 | Gosnell | 68/18 R X |
| 3,205,588 | 9/1965 | Oefjen et al. | 34/5 |
| 3,362,888 | 1/1968 | Ricigliano | 202/168 X |
| 3,222,896 | 12/1965 | Schneider | 68/12 |

Primary Examiner—Norman Yudkoff
Assistant Examiner—J. Sofer
Attorney—Robert E. Burns and Emmanuel J. Lobato

[57] ABSTRACT

A liquid-purifying system particularly for purifying the solvent used in a dry-cleaning machine comprises a combined filter and still. Filter cartridges are arranged in a closed vessel which also is provided with a heating coil for vaporizing liquid in the vessel. The level of liquid in the vessel is automatically controlled during distillation operation to provide a vapor space above the liquid. A condenser connected with the vapor space condenses the vapor produced by vaporization of the liquid and also separates any water that may be present.

8 Claims, 3 Drawing Figures

LIQUID PURIFYING SYSTEM

The present invention relates to a liquid-purifying system and particularly to a system for purifying the solvent used in dry-cleaning machines for cleaning clothing and other fabric material.

In a dry-cleaning machine, the clothing or other fabric to be cleaned is tumbled or agitated in the presence of a liquid solvent which removes dirt, oil, grease and other soiling substances from the fabric. The solvent used may be a petroleum product, for example benzene, or a synthetic solvent, for example perchlorethylene, commonly referred to as "perc."

In the operation of a dry-cleaning plant, it is necessary continually to purify the solvent used by the dry-cleaning machines since it would otherwise become contaminated with substances removed from the fabric being cleaned. Accordingly, it is customary to circulate the solvent through a filter. However, filtration removes only solid substances such as lint and dirt and does not remove other contaminants such as grease, oil and water. It is hence necessary either to discard the solvent after a certain period of use or to distill it in order to eliminate non-solid contaminants. This has required separate distilling equipment, thereby materially increasing the cost and space requirements of the dry-cleaning plant.

In accordance with the present invention, filtration and distillation of the liquid solvent of a dry-cleaning plant are carried out by a single piece of equipment which functions both as a filter and a still. During operation of the dry-cleaning machine, the solvent is circulated through the equipment in accordance with the invention operated as a filter and is thereby continuously filtered. Periodically, the equipment is operated as a still to evaporate and recondense the solvent so as to remove non-solid contaminants such as oil, grease and water, the condensed solvent being returned to the dry-cleaning machine.

The utilization of a single piece of equipment operable both as a filter and as a still results in material savings both in the cost of the equipment and the floor space it requires. Moreover, it has been found that the periodic distillation operation of the apparatus has the beneficial effect of increasing the life and effectiveness of the filter.

The nature and advantages of the invention will be more fully understood from the following description of a preferred embodiment of the invention shown by way of example in the drawings in which.

Figure 3:
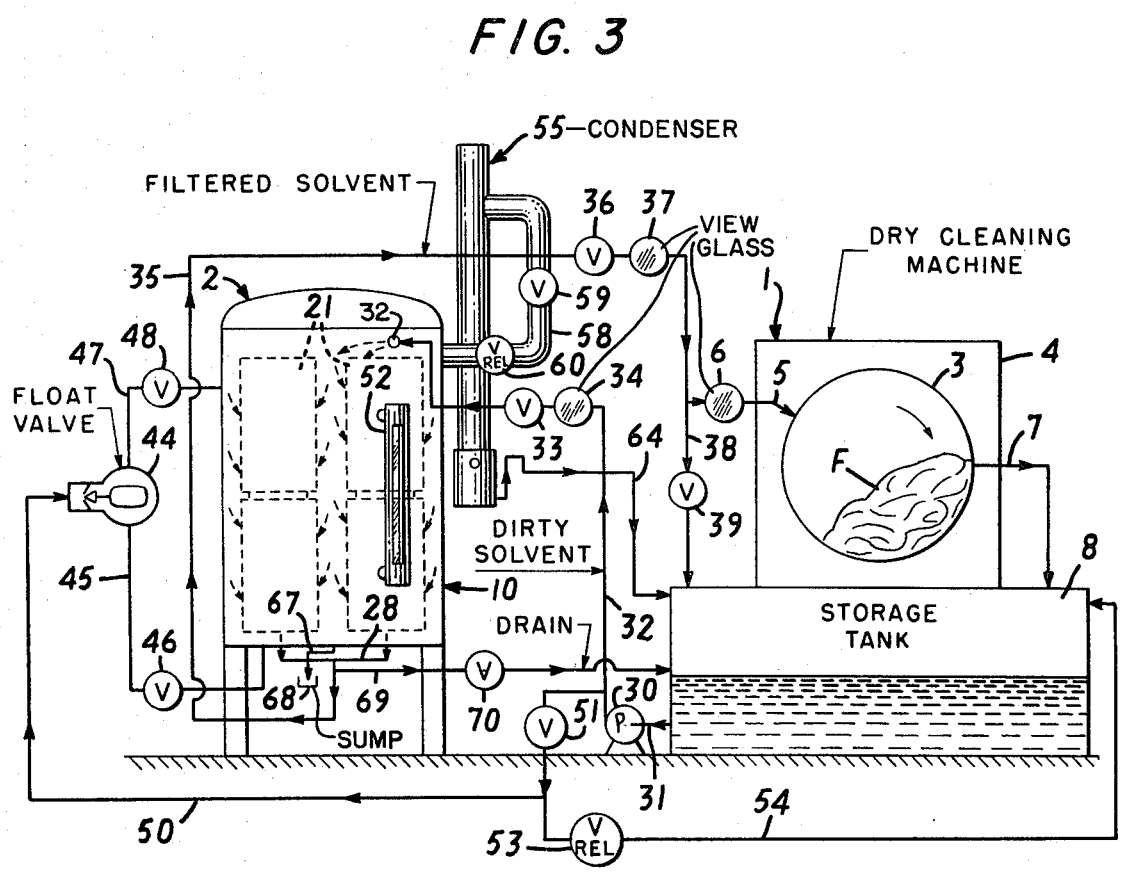
FIG. 3 is a schematic view of the equipment illustrated in FIG. 1 shown in combination with a dry-cleaning machine.

In FIG. 3, there is shown by way of example equipment for a dry-cleaning plant comprising a dry-cleaning machine 1 and a liquid-purifying system 2 for purifying the cleaning fluid or solvent used in the dry-cleaning machine. The dry-cleaning machine is shown schematically as comprising a drum 3 rotatably mounted in a housing 4 and adapted to receive the clothing or other fabric F that is to be cleaned. The liquid solvent used as a cleaning fluid is supplied through a line 5 provided with a flow glass 6 and is discharged through a line 7 to a storage tank 8.

The liquid-purifying system 2 is a combined filter and still shown as comprising a container or vessel 10 having a cylindrical side wall 11, a bottom 12 and a dome-shaped removable cover 13. The cover 13 is removably secured on the vessel by means of a plurality of swivelly mounted bolts 14 and wing nuts 15, a fluid-tight seal with the side wall of the vessel being provided by an annular gasket 16. When the cover is released by unscrewing the wing nuts 15, it can be raised by means of a screw jack 17 carried by an arm portion of a supporting bracket 18 having a vertical portion which is rotatably mounted in a bearing structure 19 which permits the lid to be swung to one side so as to provide access to the interior of the vessel.

Figure 2:
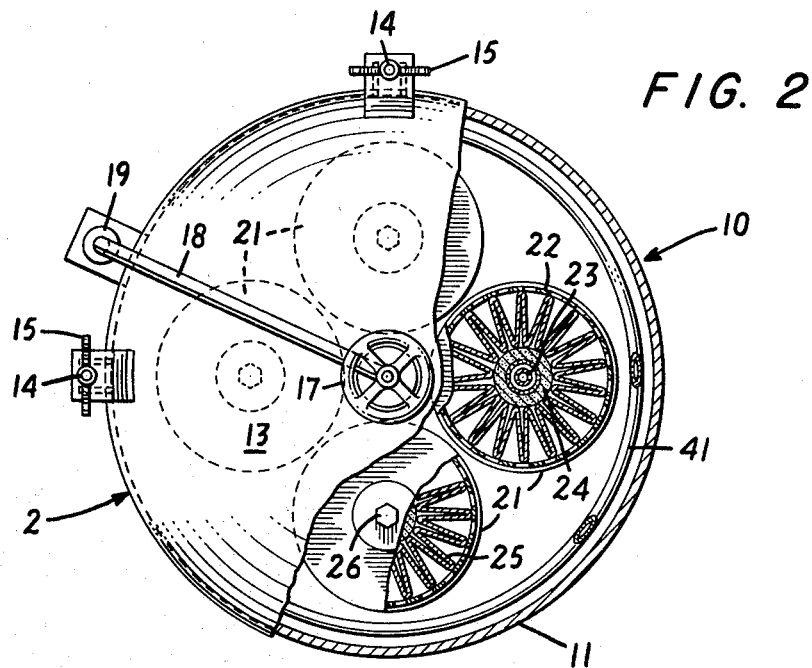
FIG. 2 is a partial plan view of the equipment with portions broken away.

Filtering means provided in the vessel 10 is shown as comprising a plurality of filter cartridges 21. Each of the cartridges is shown as having a cylindrical outer shell 22, the circumferential portion of which is perforated and an inner perforate tube 23 with suitable filtering material between the outer shell and the inner tube. The filtering material can, for example, be activated carbon or may be a combination of material, for example an inner annular portion 24 of activated carbon and an outer annular portion 25 formed of filter paper or synthetic material which is folded in zigzag manner as seen in FIG. 2 in order to increase its surface area. The size of the filter cartridges and the number of cartridges used depends on the size and capacity of the dry-cleaning equipment. In the apparatus shown by way of example in the drawings, there are eight cartridges disposed in four symmetrically arranged stacks with two cartridges disposed one above the other in end-to-end relationship in each stack. The superposed filters in each stack are secured in position by a cap or nut 26 provided with a suitable gasket to seal the upper end of the inner tube 23 of the upper cartridge in each stack. A suitable gasket is also provided between the superposed cartridges in each stack so as to provide a fluid-tight connection between the inner tubes 23 of the superposed cartridges. The lower cartridge of each stack is supported by a plate 27 connected with an outlet manifold 28. A suitable gasket is provided between the cartridge and the support plate 27 to provide a fluid-tight connection with the outlet manifold.

The solvent used in the dry-cleaning machine 1 is circulated through the filtering means in the vessel 10 by means of a pump 30 having its intake connected by a line 31 to the solvent storage tank 8 and its discharge connected to the upper portion of the vessel 10 by means of a line 32 controlled by a valve 33 and provided with a flow glass 34. The outlet manifold 28 of the vessel 10 is connected to the supply line 5 of the dry-cleaning machine through a solvent return line 35 controlled by a valve 36 and provided with a flow glass 37. The return line 35 is also connected to the storage tank 8 by means of a bypass line 38 controlled by a valve 39.

In addition to serving as a housing for the solvent-filtering means, the vessel 10 also serves as the evaporator or boiler of a still for distillation of the solvent to remove non-solid impurities. There is accordingly provided in the vessel 10 a heating element 41 for evaporating the solvent in the vessel 10. The heating element is shown as a tube or pipe which is doubled back on itself and arranged as a helical coil disposed inside the cylindrical wall 11 of the vessel 10 and encircling the assembly of filter cartridges 21. Inlet and outlet connections 42 are provided for circulating steam or other heating fluid through the coil so as to evaporate solvent contained in the vessel 10.

In order to provide a vapor space in the vessel 10 above the liquid level of the solvent in the vessel, means is provided for automatically maintaining the solvent in the vessel at a selected level, for example with the vessel approximately half full of solvent. Means for automatically maintaining the liquid level is shown by way of example in the drawings as comprising an automatic float valve 44. A line 45 controlled by a valve 46 connects the float chamber of the float chamber of the float valve 44 with the bottom of the vessel 10 while a pressure equalizing line 47 controlled by a valve 48 connects the float chamber of the float valve 44 with an upper portion of the vessel. A liquid level in the float chamber of the valve 44 is thereby maintained at the same level as liquid in the vessel 10 when the valves 46 and 48 are open. The inlet of the float valve 44 is connected to the discharge side of the pump 30 by a line 50 controlled by a valve 51. If liquid in the vessel 10, and hence in the float chamber of the float valve 44, falls below a predetermined level, the float valve 44 opens to admit more liquid supplied by the line 50. If the liquid in the vessel 10 is at or above the selected level, the float valve 44 is closed so that no additional liquid is admitted to the chamber. The liquid level in the vessel 10 can be observed visually by a sight glass 52. A pressure relief valve 53 on the discharge side of the pump 30 permits return of liquid to the tank 8 through a line 54 when the automatic valve 44 is closed.

Figure 1:
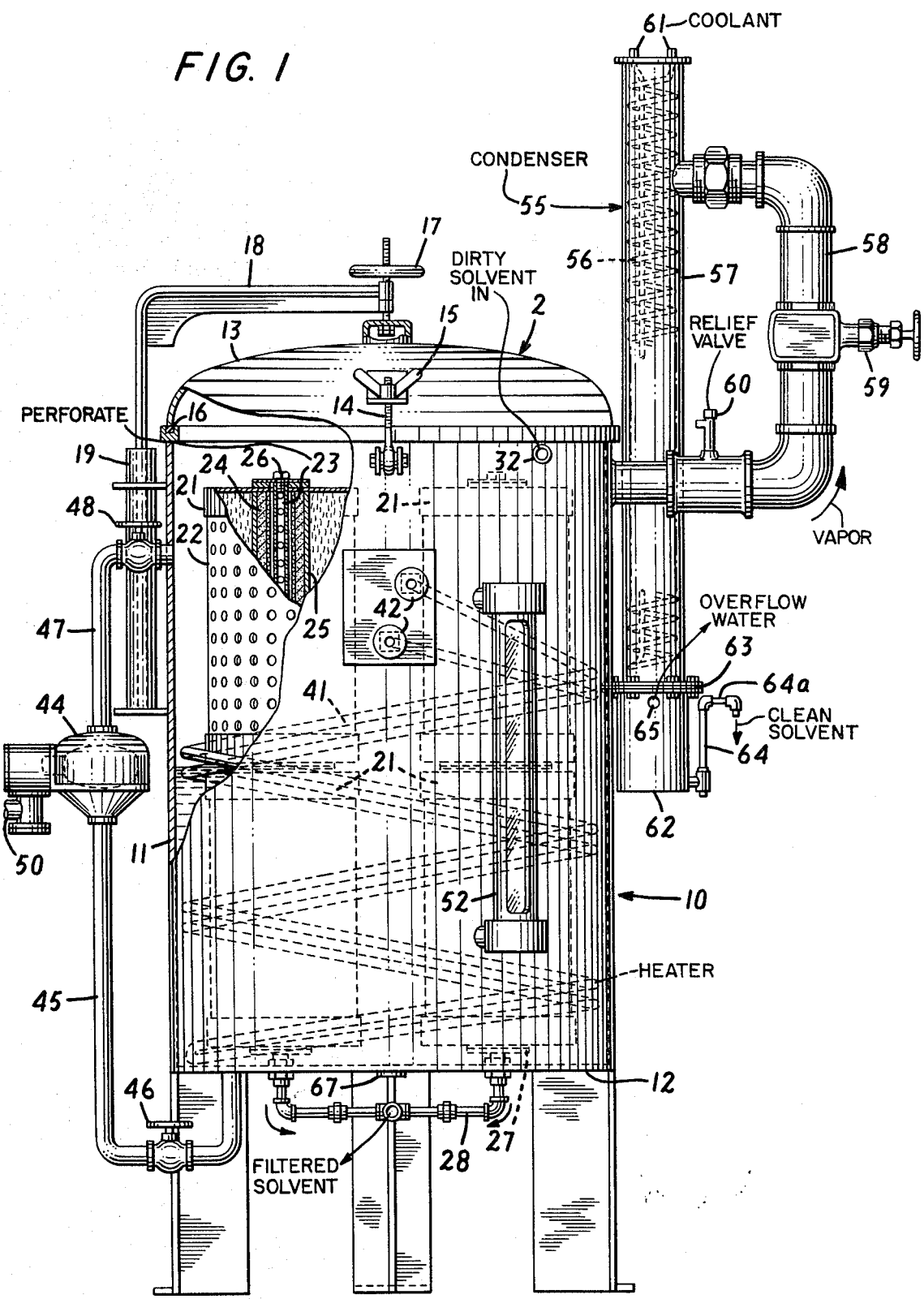
FIG. 1 is a side view of a combined filter and still in accordance with the invention, portions being broken away to show interior construction.

Vapor produced in the vessel 10 by the heating element 41 is condensed by a condenser 55 shown as a heat exchanger comprising a cooling coil 56 disposed inside a cylindrical casing 57. The condenser 55 is connected to the upper portion of the vessel 10 by a manifold 58 controlled by a valve 59 and provided with a safety release valve 60. As seen in FIG. 1, the manifold 58 opens into an upper portion of the cylindrical casing 57 of the heat exchanger. Connections 61 are provided for circulating water or other cooling fluid through the condensing coil 56. At the bottom of the cylindrical casing 57, there is provided a condensate collecting and water separating chamber 62 which is shown removably connected with the cylinder 57 by a flanged and bolted joint 63. A solvent return line 64 is connected to the chamber 62 near the bottom of the chamber and has a trap portion 64a which extends upwardly to near the top of the chamber and then down to the storage tank 8. A water discharge line 65 is connected to the chamber 62 near its top. As the cleaning solvent commonly used is heavier than water, the chamber 62 provides a gravity separator for removing water from the distilled solvent. If the cleaning solvent used is lighter than water, the connections 64 and 65 are correspondingly reversed so that water is discharged from the lower portion of the chamber 62 while solvent is discharged from the upper portion of the chamber.

In order to remove any heavy oils or other residues that remain in the vessel 10 after distillation of the solvent, the vessel is provided with a drain 67 discharging to a suitable sump or other discharge facility 68. Moreover, in order to return liquid from the vessel 10 to the storage tank 8 without going through the dry-cleaning machine, for example to lower the level of liquid in the vessel 10 in preparation for distillation operation, the outlet manifold 28 is connected to the storage tank 8 through a line 69 controlled by a valve 70.

Filtration of the cleaning solvent during operation of the dry-cleaning machine 1 is effected by operating the pump 30 and opening valves 33 and 36. The solvent is thereby delivered through line 32 to the interior of the vessel 10 where it passes through the filtering material in the several filter cartridges 21 to the inner tubes of the filter cartridges connected with the outlet manifold 28. Through the line 35 which is connected with the outlet manifold, the filtered solvent is returned to the inlet pipe 5 of the dry-cleaning machine. Dirty solvent is discharged from the dry-cleaning machine into the storage tank 8, thereby completing the circuit. If for any reason it is desired to discontinue the supply of solvent to the dry-cleaning machine without interrupting filtration of the solvent, for example during centrifuging, unloading and loading, the valve 39 is opened so as to return the filtered solvent to the storage tank 8. If during the filtering operation it is desired to heat or cool the cleaning solvent, this can be done by circulating water or other suitable temperature-controlling fluid through the coil 41 inside the filter vessel 10.

When it is desired to distill the cleaning solvent, the valves 33 and 36 are closed and valve 70 in the drain line 69 is opened to drain sufficient liquid from the vessel 10 to lower the liquid level desired for distillation, for example approximately halfway down. The valve 70 is then closed and valves 46, 48, and 51 are opened in order to maintain the liquid in the vessel 10 at the selected level by means of the automatic float valve 44. The valve 59 in the vapor manifold 58 is opened and steam or other heating fluid is circulated through 41 in the vessel 10 through the connections 42. The heat supplied through the coil 41 evaporates solvent in the vessel 10. Moreover, a portion of the heating coil preferably extends above the liquid level as seen in FIG. 1 so that the vapor is superheated. The vapor produced by boiling of the liquid in the vessel 10 is conducted by the vapor manifold 58 to the condensor 55 where the vapor is condensed by the cooling coil 56 through which water or other cooling fluid is circulated by means of the connections 61. The resulting condensate collects in the chamber 62 at the lower end of the cylindrical casing 57 of the condenser until it reaches a level determined by the upward extent of the trap portion 64a of the condensate discharge pipe 64. Any water that collects on top of the condensate is drawn off through the discharge pipe 65. The condensate is returned by gravity through line 64 to the storage tank 8. Any unevaporated residue that remains in the vessel 10 at the end of the distillation period is discharged through the drain 67 into a sump or other disposal zone 68.

The apparatus shown by way of example in the drawings has a filtering capacity of the order of 3,000 gallons per hour and a distillation capacity of the order of 50 gallons per hour. Under average conditions, it has been found sufficient to distill approximately 25 percent of the solvent after every thousand pounds of clothing or other fabric cleaned.

It will be understood that the invention is in no way limited to the preferred embodiment shown by way of example in the drawings. For example, instead of having a single storage tank 8, the dry-cleaning machine can be provided with separate storage tanks for clean and dirty solvent. If desired, two or more dry-cleaning machines can be operated with the same liquid-purifying system, providing that it has sufficient capacity. If desired, the vapor manifold 58 may be connected through suitable valves to two or more filter-evaporator vessels 10 so that the same condenser 55 can be used with two or more evaporators either concurrently or sequentially. In order to avoid rapid clogging of the filter cartridges with lint, a lint trap is preferably provided either in the line 7 for returning dirty solvent to the storage tank 8 or between the storage tank and the filter vessel 10, for example in the intake of the pump 30. Still other modifications will be apparent to those skilled in the art.

I claim:

1. In combination with a dry-cleaning machine having a cleaning section and storage means for liquid cleaning solvent, means for purifying said solvent comprising a closed vessel having a liquid inlet and a liquid outlet, filter means in said vessel arranged between said inlet and outlet so that liquid entering said vessel through said inlet and discharging through said outlet passes through said filter means and is thereby filtered, means for establishing in said vessel a liquid level leaving a vapor space above said level, means in said vessel for evaporating liquid in said vessel, condensing means connected with said vapor space for condensing vapor produced by said evaporating means, pump means for pumping said liquid cleaning solvent, said pump means having an inlet connection to said storage means and having an outlet, conduit means connecting said dry cleaning machine, closed vessel and condensing means including first conduit means connecting said outlet of said vessel with said cleaning section of said dry cleaning machine, second conduit means connecting said condensing means to said storage means, third conduit means connecting the outlet of said pump to said inlet of said vessel and fourth conduit means connecting the outlet of said pump thru said liquid level establishing means to said vessel and valve means in said conduit means for selectively circulating said liquid solvent from said storage means through said filter means in said vessel to filter said solvent as one selection and for supplying said liquid solvent to said vessel under control of said liquid level establishing means for distillation of said solvent as one selection, said second conduit means returning the resulting condensate from said condensing means to said storage means.

2. A combination according to claim 1, in which said means for establishing a liquid level in said vessel comprises valve means responsive to liquid level and controlling admission of liquid to said vessel.

3. A combination according to claim 1, further comprising gravity separator means for separating water from said condensate of said liquid solvent.

4. A combination according to claim 1, in which said filter means comprises at least one hollow cylindrical cartridge removably positioned in said vessel, the interior of said cartridge being connected with said liquid outlet.

5. A combination according to claim 4, in which said filter means comprises a plurality of hollow cylindrical cartridges, and in which said liquid outlet is branched to connect with the interiors of said cartridges.

6. A combination according to claim 5, in which said evaporating means comprises a heating coil in said vessel surrounding all of said cartridges.

7. A combination according to claim 4, in which said evaporating means comprises a heating coil in said vessel surrounding said cartridge or cartridges.

8. A combination according to claim 7, in which said heating coil extends up into said vapor space in said vessel.

* * * * *